(12) United States Patent
Abbott et al.

(10) Patent No.: US 7,727,509 B2
(45) Date of Patent: Jun. 1, 2010

(54) METAL PASSIVATION IN A HEAT EXCHANGE REFORMER

(75) Inventors: Peter Edward James Abbott, Cleveland (GB); Bernard John Crewdson, North Yorkshire (GB); Martin Fowles, North Yorkshire (GB)

(73) Assignee: Johnson Matthey PLC, London (GB)

( * ) Notice: Subject to any disclaimer, the term of this patent is extended or adjusted under 35 U.S.C. 154(b) by 1091 days.

(21) Appl. No.: 10/499,227

(22) PCT Filed: Dec. 16, 2002

(86) PCT No.: PCT/GB02/05699

§ 371 (c)(1),
(2), (4) Date: Jan. 4, 2005

(87) PCT Pub. No.: WO03/051771

PCT Pub. Date: Jun. 26, 2003

(65) Prior Publication Data

US 2005/0118089 A1  Jun. 2, 2005

(30) Foreign Application Priority Data

Dec. 17, 2001  (GB) ................................. 0130145.6

(51) Int. Cl.
*C01B 3/24* (2006.01)
(52) U.S. Cl. ........................................ 423/650; 252/71
(58) Field of Classification Search ............. 252/71–79; 423/650
See application file for complete search history.

(56) References Cited

U.S. PATENT DOCUMENTS

| 3,531,394 A | 9/1970 | Koszman |
| 4,444,731 A | 4/1984 | Konoki et al. |
| 4,863,892 A | 9/1989 | Porter et al. |
| 4,910,228 A | 3/1990 | Lywood |

(Continued)

FOREIGN PATENT DOCUMENTS

FR  2501357  9/1982

(Continued)

OTHER PUBLICATIONS

H. J. Grabke et al., "New methods of suppressing the high temperature corrosion of steels caused by 'metal dusting', i.e. catastrophic carburization," *Research Disclosure Journal*, No. 37031, Feb. 1995.

(Continued)

*Primary Examiner*—Jessica L. Ward
*Assistant Examiner*—Nicholas P D'Aniello
(74) *Attorney, Agent, or Firm*—RatnerPrestia

(57) ABSTRACT

A method for reducing the interaction between carbon monoxide present in a heat exchange medium and metals on the shell side of heat exchange reformer apparatus used for reforming of hydrocarbons by treatment of the shell-side of said apparatus with an effective amount of at least one passivation compound containing at least one element selected from phosphorus, tin, antimony, arsenic, lead, bismuth, copper, germanium, silver or gold is described. Where volatile compounds are formed by the passivation compound, the method further comprises compound recovery to prevent contamination and deactivation of subsequent process steps. The method reduces side reactions, provides improved reformer tube lifetime and allows tubes to be treated in-situ without the need for process shutdown.

11 Claims, 1 Drawing Sheet

U.S. PATENT DOCUMENTS

| | | | |
|---|---|---|---|
| 5,406,014 A | 4/1995 | Heyse et al. | |
| 5,424,335 A * | 6/1995 | Abbott | 518/706 |
| 5,593,568 A * | 1/1997 | Lemke | 208/48 AA |
| 6,274,113 B1 | 8/2001 | Heyse et al. | |
| 6,432,320 B1 * | 8/2002 | Bonsignore et al. | 252/70 |

FOREIGN PATENT DOCUMENTS

| | | | |
|---|---|---|---|
| FR | 2501357 A * | 9/1982 | |
| GB | 1 045 616 | 10/1966 | |
| GB | 1 578 270 | 11/1980 | |
| WO | WO-97/05947 | 2/1997 | |
| WO | WO-00/09441 A3 | 2/2000 | |
| WO | WO-01/66806 A1 | 9/2001 | |

OTHER PUBLICATIONS

International Search Report dated Apr. 11, 2003, from International Application No. PCT/GB02/05699.

* cited by examiner

METAL PASSIVATION IN A HEAT EXCHANGE REFORMER

This application is the U.S. national phase application of PCT International Application No. PCT/GB02/05699, and claims priority of British Patent Application No. 0130145.6.

FIELD OF THE INVENTION

This invention relates to methods for passivating metal surfaces in apparatus subjected to high temperature processes and in particular to methods for reducing methanation reactions, shift reactions and carburization reactions in steam reforming apparatus.

BACKGROUND OF THE INVENTION

In the steam reforming process a process gas, i.e. a mixture of a hydrocarbon feedstock and steam, and in some cases also carbon dioxide or other components, is passed at an elevated pressure through catalyst-filled heat exchange tubes disposed with in a vessel and which are externally heated on the shell side by means of a suitable heating medium, generally a hot gas mixture. The heating medium may be a combusting hydrocarbon fuel, a flue gas or the process gas that has passed through the tubes but which has then been subjected to further processing before being used as the heat exchange medium. For example GB 1 578 270 describes a process where a primary reformed gas is subjected to partial oxidation where it is partially combusted with oxygen or air and, in some cases is then passed through a secondary reforming catalyst bed (the process known as secondary reforming). The resultant partially combusted gas, by which term we include secondary reformed gas, is then used as the heat exchange medium, passed into the shell side of the primary reformer to heat the tubes. Where a secondary reformed gas is used as the heat-exchange medium, it normally contains methane, hydrogen, carbon oxides, steam and any gas, such as nitrogen, that is present in the feed and which is inert under the conditions employed. If flue gas is used as the heat exchange medium it typically contains large amounts of carbon oxides, steam and inert gasses.

Heat exchange reformers are typically fabricated from Ni-containing steels. Undesirable side reactions can occur under some conditions on the shell side of heat exchange reformer apparatus that are promoted by nickel and iron in the steel, particularly on the heat exchange tubes. The undesirable side reactions include methanation, shift and carburization reactions. We have realised that these reactions result either directly or indirectly from a catalytic interaction between metals in the steel and carbon monoxide (CO) present in the heat exchange medium. In steam reforming where the heat exchange medium in the primary reformer is the primary reformed gas that has been subjected to further processing, this problem is exacerbated by the desire, for economic reasons, to operate at low steam ratios, i.e. low steam to hydrocarbon ratios, which results in increased CO levels in the reformed gas used as the heat exchange medium in the primary reformer.

Methanation is the conversion of carbon oxides to methane and water, i.e. the reverse of steam reforming and is promoted for example by nickel. The CO reaction is depicted below;

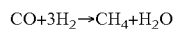

The shift reaction is the reaction of carbon monoxide with steam to produce carbon dioxide and hydrogen and is promoted for example by iron. The reaction is depicted below;

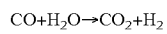

Both these reactions can reduce the efficiency of the reforming process.

Carburization is believed to be, in part, the formation of metal-carbides on the surface of the steel by reaction of the metal with deposited carbon. The deposited carbon can result from both CO reduction and CO disproportionation reactions. These reactions occur on metal surfaces and may be catalysed by Fe, Ni or Cr. The carbon forming reactions are depicted below;

Reduction: $CO+H_2 \rightarrow C+H_2O$

Disproportionation: $2\ CO \rightarrow C+CO_2$

The carburization of steels is also known as 'metal dusting' and leads to corrosion of the metal surfaces, which may lead for example, to failure of the reformer tube. Increased levels of methane in the process gas may also arise via hydrogenation of the deposited carbon.

Because process efficiency and corrosion are effected by the carbon monoxide reactions it is desirable to reduce the interaction between carbon monoxide (CO) present in the heat exchange medium and metals in the steel on the shell side of reformer apparatus.

It is known that sulphur compounds such as dimethylsulphide added to a process gas in contact with a metal surface may suppress the carburization process, but have the disadvantage that the sulphur species formed are mobile and consequently may poison catalysts in subsequent catalysed process steps.

In WO 00/09441 a reforming process is disclosed wherein corrosion of the shell side of a heat exchange reformer by a high temperature secondary reformed gas used as heat exchange medium may be reduced by introducing a sulphur compound, such as dimethylsulphide into the secondary reformed gas after it leaves the secondary reforming apparatus and before it enters the heat exchange reformer as heat exchange medium. The amount of sulphur compound necessary to obviate such corrosion problems was stated to be such as to give a sulphur content of 0.2-20 ppm by volume in the secondary reformed gas. Because sulphur only binds weakly to the catalytic metal sites, to prevent contamination and deactivation of catalysts in subsequent process steps, the sulphur compounds were removed by passing the secondary reformed gas exiting the heat exchange reformer through a bed of a suitable absorbent for sulphur compounds, such as zinc oxide.

It has been found however that to be effective, higher amounts of sulphur in the heat exchange medium are required. However, increasing the level of sulphur in the heat exchange medium above 20 ppm by volume leads to difficulties with removal using conventional absorbents. Furthermore the provision of sulphur-removing apparatus adds additional cost and complexity to the reforming process.

WO 01/66806 describes a method for preventing nitridation and/or carburization of metal surface by adding a sulphur compound and a lower amount of a phosphorus compound to the process gas in contact with the metal. It is suggested that the phosphorus compound acts to prevent corrosive sulfidation of the metal surfaces that occurs when sulphur compounds are added to prevent the nitridation and/or carburization reactions. In the examples, addition of 2 ppm of phosphorus in the form of phosphorus pentoxide to a gas containing 20 ppm of hydrogen sulphide completely prevented the sulphur compound from adhering to the metal surfaces. However, it was also shown that if the metal surface was subjected to phosphine pre-treatment, nitridation of the metal was not prevented.

Attempts have been made to find alternatives to sulphur compound addition. For example, the carburization reaction may be reduced by using corrosion-resistant alloys prepared by alloying other elements with steel (see H. J. Grabke, Research Disclosure, 37031, 1995/69). Other elements cited included lead (Pb), arsenic (As), antimony (Sb), bismuth (Bi), selenium (Se) and tellurium (Te). Antimony and arsenic alloys in particular were stated as having some effect on carburization however their effectiveness varied. This approach however, is expensive and cannot to be implemented in existing reactors without process shutdown.

Alternatively, the same author proposed that carburization may be reduced by applying a solution or slurry of Pb, As, Sb and Bi compounds to the apparatus however no details were provided on how this may be achieved.

Thus no methods have been disclosed that satisfactorily reduce the methanation, shift and carburization reactions on the shell side of reformer apparatus and in particular where the heat exchange medium for the reformer is the primary reformed gas that has been subjected to a further processing step comprising for example, a partial oxidation and secondary reforming step.

SUMMARY OF THE INVENTION

We have discovered that treatment of the shell-side of reformer apparatus with compounds that provide an effective amount of P, Sn, Sb, As, Pb, Bi, Cu, Ge, Ag or Au optionally with compounds containing Al, Ga, Cr, In or Ti can passivate the catalytically active sites and reduce undesirable side reactions.

Accordingly the invention provides a method for reducing the interaction between carbon monoxide present in a heat exchange medium and metal surfaces on the shell side of heat exchange reformer apparatus used for producing a primary reformed gas by treatment of the shell-side of said apparatus with an effective amount of at least one passivation compound containing at least one atom selected from phosphorus, tin, antimony, arsenic, lead, bismuth, copper, germanium, silver or gold.

The invention further provides a process for reforming of hydrocarbons comprising the steps; (i) subjecting a gaseous mixture containing at least one hydrocarbon and steam to catalytic primary reforming at an elevated temperature in heat exchange reformer apparatus by passing said mixture through tubes containing a steam reforming catalyst to form a primary reformed gas, the exterior of said tubes being heated by a heat exchange medium flowing through the shell side of said apparatus, and (ii) adding to said heat exchange medium before it enters said shell side, a passivation compound containing at least one atom selected from phosphorus, tin, antimony, arsenic, lead, bismuth, copper, germanium, silver or gold.

It will be understood by those skilled in the art that such treatment of the reformed gas according to the process of the present invention may, depending on the point of addition and the quantity of passivating compound added, prevent the undesirable side reactions from occurring in apparatus downstream of the reformer apparatus such as heat exchangers and the like.

BRIEF DESCRIPTION OF THE DRAWING

The invention may be understood from the following detailed description when read in connection with the accompanying FIGURE.

DETAILED DESCRIPTION OF THE INVENTION

Figure 1:
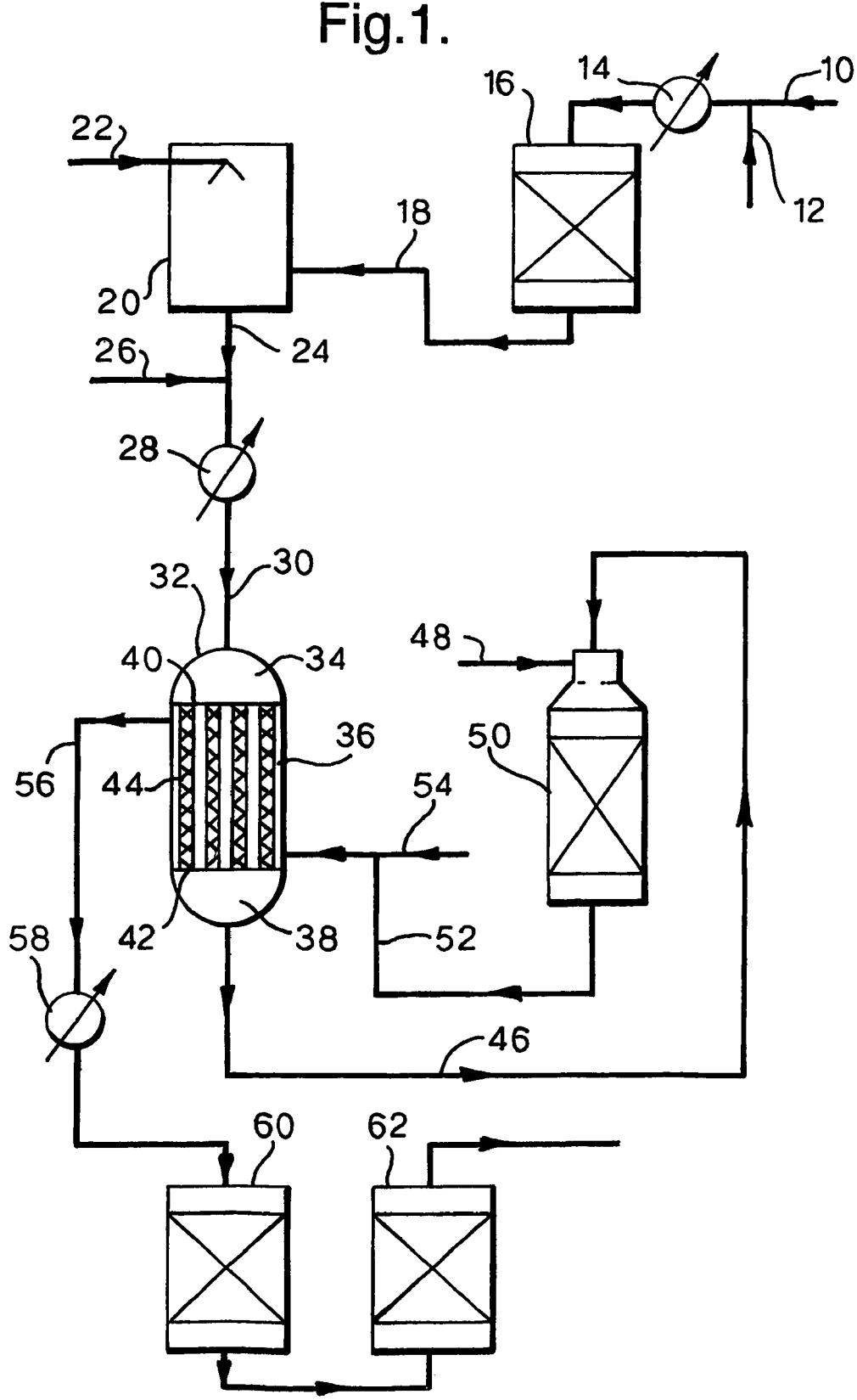
FIG. 1 is a schematic view of a process according to one embodiment of the present invention.

In the present invention, primary reforming is effected using heat exchange reformer apparatus. In heat exchange reformer apparatus a process fluid is passed from a process fluid feed zone, through heat exchange tubes optionally containing a particulate catalyst, disposed within a heat exchange zone defined by a shell through which a heat exchange medium passes, and then into a process fluid off-take zone. Means, such as tube-sheets, are provided to separate the zones. Thus a tube-sheet may separate the heat exchange zone through which the heat exchange medium passes from a zone, such as a plenum chamber, communicating with the interior of the heat exchange tubes to permit feed of process fluid to the tubes or off-take of process fluid from the tubes. An alternative arrangement involves the use of header pipes disposed within the heat exchange zone to define the process fluid feed zone: the process fluid is fed to the header pipes from whence it flows into and through the heat exchange tubes. Similarly header pipes may be provided for the off-take of process fluid from the tubes. Alternatively there may be a combination of tube-sheets and header pipes. Heat exchange medium flows through the shell around the outside of the heat exchange tubes which may have sheath tubes surrounding them for a part of their length. Heat exchange reformers of this type are described in the aforementioned GB 1 578 270, and WO 97/05 947.

Another type of heat exchange reformer apparatus that may be used is a double-tube heat exchange reformer as described in U.S. Pat. No. 4,910,228 wherein the reformer tubes each comprise an outer tube having a closed end and an inner tube disposed concentrically within the outer tube and communicating with the annular space between the inner and outer tubes at the closed end of the outer tube with the steam reforming catalyst disposed in said annular space. Heat exchange medium flows around the external surface of the outer tubes.

The shell side of such reformer apparatus shall be taken to include all the surfaces within the shell of said apparatus that are exposed to heat exchange medium. Such surfaces include the inner surface of the shell defining the heat exchange zone, the outer surfaces of heat exchange tubes, the outer surfaces of any fins attached to the heat exchange tubes to increase their heat transfer area, the surfaces of any sheath tubes surrounding the heat exchange tubes, the surfaces of any tube-sheets defining the boundaries of said heat exchange zone and which are exposed to heat exchange medium and the outer surfaces of any header pipes within said heat exchange zone.

The method of the present invention is of particular utility for catalytic steam reforming apparatus used for steam reforming of hydrocarbons wherein a mixture of a hydrocarbon feedstock and steam, and in some cases also carbon dioxide or other components, is passed at an elevated pressure through catalyst-filled heat exchange tubes which are externally heated to a maximum temperature in the range 700° C. to 900° C. by means of a suitable heating medium, generally a hot gas mixture, so as to form a primary reformed gas. The catalyst is normally in the form of shaped units, e.g. cylinders, rings, saddles, and cylinders having a plurality of through holes, and are typically formed from a refractory support material e.g. alumina, calcium aluminate cement, magnesia or zirconia impregnated with a suitable catalytically active material which is often nickel and/or ruthenium.

The hydrocarbon feedstock may be any gaseous or low boiling hydrocarbon feedstock such as natural gas or naphtha. It is preferably methane or natural gas containing a substantial proportion, e.g. over 90% v/v methane. The feedstock is preferably compressed to a pressure in the range 20-80 bar abs. If the feedstock contains sulphur compounds, before, or preferably after, compression the feedstock is subjected to desulphurisation, e.g. hydro-desulphurisation and absorption of hydrogen sulphide using a suitable absorbent, e.g. a zinc oxide bed to substantially remove sulphur compounds. Usually it is desirable to incorporate a hydrogen-containing gas into the feedstock prior to hydro-desulphurisation.

The heating medium may be a combusting hydrocarbon fuel, a flue gas or the primary reformed gas that has been subjected to further processing. It is preferable that the heat exchange medium fed to the shell side of the heat exchange reformer is substantially free of sulphur compounds. In a preferred embodiment the heat exchange medium is the primary reformed gas exiting the process fluid off-take zone that has been subjected to a further processing step. The further processing step is typically partial combustion with an oxygen-containing gas, e.g. air. Preferably the partially combusted primary reformed gas is then passed through a bed of a secondary reforming catalyst, so as to effect further reforming (i.e. secondary reforming), before being used as the heat exchange medium.

The method of the present invention requires the treatment of the shell side of a heat exchange reformer apparatus. By treatment we mean coating of the metal surfaces on the shell side of the heat exchange reformer with a passivation compound and any other compounds that may be added to improve the effectiveness of the passivation compounds, herein termed augmenting compounds. Because of the high temperatures within heat exchange reformer apparatus in use, the passivation compound and any augmenting compound will generally undergo some thermal transformation resulting in the formation of passivation species that reduce the interaction between carbon monoxide present in a heat exchange medium and catalytically active metals, e.g. on the shell side of heat exchange reformer apparatus.

The passivation species of the present invention typically take the form of alloys with, or inert coatings on the metal surfaces. For example, tin and antimony compounds may, under the conditions in the heat exchange reformer apparatus, form stable tin or antimony alloys with nickel present in steel reformer tubes; chromium and aluminium compounds may form oxide coatings and gold may form an inert metal coating.

Preferably the passivation compounds form passivation species within the shell side of the heat exchange reformer apparatus that are non-volatile such that they remain substantially on the metal surfaces within the shell side of the heat exchange reformer apparatus, i.e. they have a low vapour pressure at the operating conditions within the apparatus. Sulphur compounds form volatile passivation species and therefore are not suitable in the method or process of the present invention.

The passivation compounds that may be used in the present invention are compounds containing at least one atom selected from the elements consisting of phosphorus (P), lead (Pb), tin (Sn), arsenic (As), antimony (Sb), bismuth (Bi), copper (Cu), germanium (Ge), silver (Ag) or gold (Au). The compounds should contain one or more atoms of the above elements and may contain more than one atom of the same element. The compounds may be elemental species, those termed 'organic', including metal-organic compounds, or those termed 'inorganic'. The compounds selected will be chosen based on a number of factors including the amount of passivating element, vapour pressure of the species formed in the shell side of the apparatus, their cost effectiveness and ease of handing. Suitable passivation compounds are as follows wherein 'alkyl' means branched or linear C1-C50 and 'aryl' means e.g. phenyl or substituted phenyl unless otherwise stated.

Suitable phosphorus-containing compounds include elemental phosphorus (e.g red P), organic compounds comprising esters of phosphorus oxo-acids, e.g. alkyl- or arylphosphate esters, pyrophosphate esters, phosphite esters, alkyl or arylphosphinic acid esters, alkyl or aryl phosphonic acid esters, phosphine, alkyl or arylphosphines or phosphine oxides and inorganic compounds comprising phosphorus oxides and oxoacids, oxosulphides, phospazines, metal phosphides, and phosphite or phosphate salts. Preferred P-compounds include esters of phosphorus oxo-acids, e.g. phosphate esters such as trimethyl phosphate, triethyl phospate and tributyl phosphate and phosphines.

Suitable lead, tin, arsenic, antimony, bismuth, copper, silver and gold-containing compounds include elemental Pb, Sn, As, Sb, Bi, Cu, Ag and Au metals (including colloidal Au suspensions), inorganic compounds comprising oxides and oxo compounds, including hydrous oxides, oxo-acids and hydroxides, sulphides, sulphates, sulphites, phosphates, phosphites, carbonates or nitrates and metal-organic compounds, comprising metal carboxylates, thiocarboxylates, or carbamates, metal alkyl- or arylsulphonates, metal alkyl- or arylphosphates, metal alkyl- or arylphosphonates or thiophosphonates, metal alkyls, metal aryls, metal-nitrile complexes, metal alkoxides and aryloxides and chelated compounds. Suitable chelating ligands include β-diketones, ketoesters, glycols and alkanolamines. Preferably the metal passivation compounds do not contain sulphur atoms and most preferably are oxides, e.g. $Sb_2O_5$, $Bu_2SnO$, carboxylates, e.g. $Sb(O_2CCH_3)_3$, $Sb(O_2CC_7H_{15})_3$, $Sn(O_2CC_7H_{15})_2$, $Bu_2Sn(O_2CC_{11}H_{23})$, or alkyls, e.g. $Bu_4Sn$ (where $Bu=C_4H_9$).

Augmenting compounds, may optionally be added with the passivation compounds in order to improve the ability of the passivation compounds to reduce side reactions. Augmenting compounds preferably contain at least one atom selected from aluminium, gallium, chromium, indium or titanium. Suitable augmenting compounds include inorganic compounds comprising oxides and oxo compounds, including hydrous oxides, oxo-acids and hydroxides, sulphides, sulphates, sulphites, phosphates, phosphites, carbonates or nitrates and metal-organic compounds, comprising metal carboxylates, thiocarboxylates, or carbamates, metal alkyl- or arylsulphonates, metal alkyl- or arylphosphates esters, metal alkyl- or arylphosphonates or thiophosphonates, metal alkyls, metal aryls, metal alkoxides and aryloxides and chelated compounds. Suitable chelating ligands include β-diketones, ketoesters, glycols and alkanolamines. Preferably the augmenting compounds do not contain sulphur atoms and most preferably are carboxylates, e.g. $Cr_3(O_2CCH_3)_7(OH)_2$, or alkoxides, e.g. M(OR)x (where M=metal, R=alkyl C1-C20, and x=valency of metal) or chelated compounds.

The shell side of the apparatus may be treated with an effective amount of passivating compound in the absence of heat exchange medium (i.e. off-line treatment), e.g. before (or after) exposure to heat exchange medium. Alternatively, the shell side of the apparatus may be treated by exposure to heat exchange medium containing an effective amount of passivation compound (i.e. on-line treatment) or a combination of both off-line and on-line treatments may be used.

Where the treatment of the shell side of the heat exchange reformer is in the absence of heat exchange medium, i.e. an off-line treatment, the passivation compound and any augmenting compound may be introduced by vapourising the compound in an inert gas, e.g. nitrogen or air, which may be heated, or by application to the apparatus of a solution or slurry of the compound, e.g. by spraying, brushing or immersion. Suitable solvents or carriers include water, alcohols or hydrocarbons. The concentration of passivation compound and the exposure time should be such that an effective amount of the passivation compound is deposited on the exposed metal surfaces within the shell side of the heat exchange reformer to substantially reduce the interaction between carbon monoxide present in a heat exchange medium and said metal surfaces.

Where the treatment of the shell side of the heat exchange reformer is by addition of the passivation compound and any augmenting compound to the heat exchange medium, i.e. on-line, treatment may be achieved by addition of neat compound or a solution or dispersion of the compound in a suitable diluent to the heat exchange medium. Where a diluent or solvent is used it is preferable, when addition is continuous, that the addition rate is such that the temperature of the heat exchange medium is not reduced by more that 10 degrees C., in order not to impact on the performance of the heat exchange reformer apparatus. Alternatively where the addition of passivation compound is periodic, a greater temporary reduction in temperature of the heat exchange medium may be tolerated. Alternatively, where the passivation compounds are stable at or above their boiling points, they may be introduced as gasses.

The amount of the compounds added should be such that; if a phosphorous-containing compound is used, phosphorus is present in the heat exchange medium at a level between 0.1 and 1000 ppm, preferably between 1 and 1000 ppm by volume and most preferably between 12 and 100 ppm by volume; if a tin, antimony, arsenic, lead, bismuth, copper, germanium, silver or gold-containing compound is used, these metals are present in the heat exchange medium at a level between 0.1 and 1000 ppm, preferably between 1 and 100 ppm by volume; if an aluminium, gallium, chromium, indium or titanium-containing compound is used, these metals are present in the heat exchange medium at a level between 1 and 100 ppm by volume.

The shell side of the reformer apparatus may be treated on-line by either a continual or periodic addition of the passivation compound and any augmenting compound to the heat exchange medium. Alternatively, the shell side of the reformer apparatus may be treated off-line e.g. with a passivation compound dispersed in an inert carrier gas and then treated with a continual or periodic addition of the same or different passivation compound dispersed in heat exchange medium.

Where the treatment is by entrainment in a gas, the passivation compound and any augmenting compound may be added to the heat exchange medium (on-line treatment) or an inert carrier gas (off-line treatment) at any point before it enters the shell side of the heat exchange reformer. However, to prevent unwanted deposition of passivation compound, the addition point is preferably as close as practical to the heat exchange reformer. In an embodiment where the heat exchange medium is a primary reformed gas that has been subjected to a further processing step, e.g. partial oxidation and secondary reforming, it is preferred that the passivation compound is added to the heat exchange medium after the secondary reforming step, in order to prevent de-activation of any secondary reforming catalyst.

Where a passivation or augmenting compound forms a volatile species under the conditions present in the shell side of the heat exchange reactor, and that volatile species is capable of deactivating catalysts in subsequent process steps, it is preferable to provide means downstream of the heat exchange reformer apparatus to recover the volatile species to prevent contamination of subsequent processes or poisoning of catalysts in any subsequent process steps. However it is preferred to use passivation compounds that do not provide such volatile species.

Passivation compounds comprising phosphorus, tin, antimony, arsenic, copper, germanium, silver and gold atoms are preferred and particularly preferred passivation compounds are those containing phosphorus, arsenic, tin and/or antimony atoms. Passivation compounds containing phosphorus atoms are especially preferred because of their lower relative cost and ease of handling and use. Furthermore, it has been found that the addition of phosphate esters to the heat exchange medium has minimal impact on downstream processes. For example, where the reformed gas is cooled after it has passed through the shell side of the reformer apparatus, any phosphorus compound present may be removed in the process condensate.

If tin and antimony passivation compounds are chosen, they may be used alone or together in relative molar amounts ranging from 1:99 to 99:1. Tin and antimony form stable compounds with nickel present in the steel surfaces on the shell side of the heat exchange reformer apparatus. In the case of tin, the stable species expected to form with nickel on the metal surfaces within the shell side of the heat exchange reformer apparatus are $Ni_3Sn_2$ and $Ni_3Sn$. These alloys are thermodynamically more stable than Sn, SnO(s) and $SnO_2$. The species expected to exist in the vapour phase under the conditions present on the shell side of the apparatus is SnO, which has a very low maximum vapour pressure above these alloys at 927° C. of $1.4 \times 10^{-8}$ atm. With antimony, the stable species expected to form with nickel is NiSb which is thermodynamically more stable than Sb, $Sb_2O_3$ and $Sb_2O_5$. The species expected to exist in the vapour phase is SbO which has a maximum vapour pressure above the alloy at 927° C. of $1.2 \times 10^{-3}$ atm.

Effective treatment of the shell side of reformer apparatus according to the method of the present invention results in a reduction of the undesirable carbon monoxide reactions that can occur. The reduction may be observed by monitoring the methane and/or carbon dioxide levels in the heat exchange medium pre- and post-treatment The reduction in methane and carbon dioxide that may be achieved depends on the quantity and nature of the passivation compounds as well as the method of treatment of the reformer apparatus and the carbon monoxide content of the heat exchange medium. Typically, reductions in the range 5-100% of methane and/or carbon dioxide content may be observed.

The invention will further be described with reference to FIG. 1, which depicts a process flowsheet incorporating one embodiment of the present invention.

Referring to FIG. 1, natural gas at an elevated pressure, typically in the range 15 to 50 bar abs., is fed via line 10 and mixed with a small amount of a hydrogen-containing gas fed via line 12. The mixture is then heated in heat exchanger 14 and fed to a desulphurisation stage 16 wherein the gas mixture is contacted with a bed of a hydro-desulphurisation catalyst, such as nickel or cobalt molybdate, and an absorbent, such as zinc oxide, for hydrogen sulphide formed by the hydro-desulphurisation. The desulphurised gas mixture is then fed, via line 18, to a saturator 20, wherein the gas contacts a stream of heated water supplied via line 22. The saturated gas leaves the saturator via line 24 and may if desired be subjected to a step of low temperature adiabatic reforming before being mixed with recycled carbon dioxide supplied via line 26 and then heated in heat exchanger 28 to the desired heat exchange reformer inlet temperature. The heated process gas is then fed, via line 30, to the catalyst-containing tubes of a heat exchange reformer 32. The heat exchange reformer has a process fluid feed zone 34, a heat exchange zone 36, a process fluid off-take zone 38 and first 40 and second 42 boundary means separating said zones from one another. The process fluid is subjected to steam reforming in a plurality of heat exchange tubes 44 containing a steam reforming catalyst to give a primary reformed gas stream. Only 4 tubes are shown; it will be well understood by those skilled in the art that in practice there may be 10's or 100's of such tubes. The primary reformed gas stream is then passed from said heat exchange tubes 44 to the process fluid off-take zone 38, and thence via line 46 to further processing. The further processing comprises partial combustion with an oxygen-containing gas, supplied via line 48, in a vessel containing a bed of secondary reforming catalyst 50, for example nickel supported on calcium aluminate or alumina. The resultant secondary reformed gas is passed via line 52 to heat exchange zone 36 as the heat exchange medium. Passivation compound feed apparatus (not shown) feeds passivation compound via line 54 to the secondary reformed gas in line 52 in order to disperse passivation compound within the heat exchange medium prior to entry to the heat exchange zone 36. The passivation compound feed apparatus may comprise a tube, fed by a suitable metering pump from a reservoir of passivation compound, inserted into the heat exchange medium feed line. The tube typically may have a nozzle having a plurality of small holes so that the passivation compound is introduced in the form of small droplets or an aerosol that is readily dispersed into said heat exchange medium. The heat exchange medium passes up through the spaces between the heat-exchange tubes thereby supplying the heat required for the primary reforming and exits the reactor via line 56. The passivation compound is deposited upon the outer surfaces of the heat exchange tubes 44 and other metal surfaces within the shell side of the heat exchange zone 36. The reformed gas in line 56 is then cooled in heat exchanger 58, which may be a steam-raising boiler.

Where a volatile species that is capable of deactivating catalysts in subsequent process steps forms as a result of deposition of the passivation compound it may be removed by passing the reformed gas through suitable absorbents disposed in vessels 60 and 62. These vessels may be arranged such that when the beds within 60 become saturated, the reformed gas is fed directly to vessel 62 and vessel 60 is taken off-line and replenished with fresh absorbent. When vessel 60 has been replenished, it is re-introduced into the process line as the downstream vessel in readiness for when the beds in vessel 62 become saturated.

EXAMPLES

The invention will be further described by way of the following example. An experiment was set up in which synthesis gas was passed through a tube made from an alloy of Nickel and Iron, that displayed an activity for chemical reactions to produce carbon dioxide and methane by the shift, disproportionation and methanation reactions. The synthesis gas composition was as follows:

| | |
|---|---|
| $CH_4$ | 0.2% |
| CO | 10.7% |
| $CO_2$ | 6.5% |
| $H_2O$ | 42.9% |
| $H_2$ | 39.4% |
| $N_2$ | 0.2% |

The gas, fed continuously at a temperature of 1020° C. and a pressure of 40 bara, was cooled down to 530° C. as it passed through the tube. The reactions on the surface of the tube caused the composition of the gas to increase in carbon dioxide and methane content to give a cooled gas composition as follows:

| | |
|---|---|
| $CH_4$ | 2.2% |
| CO | 5.3% |
| $CO_2$ | 10.7% |
| $H_2O$ | 42.7% |
| $H_2$ | 38.9% |
| $N_2$ | 0.2% |

A 30 wt % solution of a trimethyl phosphate in water was prepared. This aqueous solution was pumped into the gas upstream of the reactive tube through an injection point in a refractory lined pipe. This point consisted of a 5 mm diameter tube, which passed through the refractory lining with a number of holes of diameter 0.5 mm at the tip, which protruded approximately 10 mm into the gas stream. The solution was introduced at a low rate such that the water and phosphorus-containing compound, being in small droplet form, would quickly evaporate into the gas stream, with the temperature dropping by less than 5 deg. C. The solution batch was introduced over a time period of 15 minutes, such that the level of phosphorus in the gas during the dosing was 15 ppm (as P) during this time.

The immediate result of the injection was a drop in the observed reaction rates for carbon dioxide and methane formation. However, during the next few days it was observed that the reaction rates started to increase. The above treatment was repeated, whereupon it was observed that the rates were reduced once more but to a greater extent that that observed from the first treatment.

The above method was repeated until no further reduction in the rates of carbon dioxide and methane formation were observed, at which point the average composition of the product gas was as follows:

| | |
|---|---|
| $CH_4$ | 0.35% |
| CO | 8.55% |
| $CO_2$ | 8.7% |
| $H_2O$ | 41.1% |
| $H_2$ | 41.1% |
| $N_2$ | 0.2% |

In order to maintain this situation, a time averaged addition of 0.06 mg of phosphorus per $Nm^3$ of gas was injected to the feed gas in the manner indicated above once every 4 days, this equating to 0.6 g phosphorus per square meter of tube surface area.

It can be seen that the addition of the phosphorus compound has almost completely stopped the reaction that is producing methane and has significantly reduced the rate of formation of carbon dioxide.

The invention claimed is:

1. A process for reforming of hydrocarbons comprising the steps;
  (i) subjecting a gaseous mixture containing at least one hydrocarbon and steam to catalytic primary reforming at an elevated temperature in heat exchange reformer apparatus by passing said mixture through tubes containing a steam reforming catalyst to form a primary reformed gas, the exterior of said tubes being heated by a carbon-monoxide-containing heat exchange medium flowing through the shell side of said apparatus, and (ii) adding to said heat exchange medium before it enters said shell side, after the reforming step, a passivation compound to reduce the interaction between the carbon monoxide present in said heat exchange medium and metals in the shell side of said heat exchange reformer apparatus, said passivation compound containing at least one atom selected from the group consisting of phosphorus, tin, antimony, arsenic, lead, bismuth, copper, germanium, silver, and gold.

2. A process according to claim 1 wherein the passivating compound contains at least one phosphorus atom.

3. A process according to claim 1 wherein at least one augmenting compound is added with said passivation compound, said augmenting compound containing at least one atom selected from the group consisting of aluminum, gallium, chromium, indium, and titanium.

4. A process according to claim 1 wherein the amount of phosphorus, tin, antimony, arsenic, lead, bismuth, copper, germanium, silver or gold present in the heat exchange medium is between 0.1 and 1000 ppm by volume.

5. A process according to claim 3 wherein the amount of aluminum, gallium, chromium, indium or titanium present in the heat exchange medium is between 1 and 100 ppm by volume.

6. A process according to claim 1 wherein the heat exchange medium is the primary reformed gas produced by the heat exchange reformer apparatus that has been subjected to a further processing step comprising a partial oxidation step and subsequently a secondary reforming step.

7. A process according to claim 6 wherein the passivation compound and any augmenting compound is added to the heat exchange medium after the secondary reforming step.

8. A process according to claim 1 wherein when the passivation compound and any augmenting compound form volatile species under the conditions present in the shell side of the heat exchange reactor that are capable of deactivating catalysts in subsequent process steps, means to recover the volatile species are provided downstream of the heat exchange reactor to prevent contamination of subsequent processes or poisoning of catalysts in any subsequent process steps.

9. A process according to claim 1 wherein the carbon-monoxide-containing heat exchange medium is a gas mixture.

10. A process according to claim 1 wherein the at least one hydrocarbon is selected from methane or natural gas.

11. A process according to claim 1, wherein the primary reformed gas is subjected to further processing to generate the heat exchange medium.

\* \* \* \* \*